United States Patent [19]

Burgess

[11] Patent Number: 5,384,044
[45] Date of Patent: Jan. 24, 1995

[54] FLUID SEPARATION DEVICES AND METHODS OF MAKING SAME

[75] Inventor: Keith E. Burgess, Kennebunk, Me.

[73] Assignee: Techniweave, Inc., Rochester, N.H.

[21] Appl. No.: 116,856

[22] Filed: Sep. 7, 1993

[51] Int. Cl.⁶ .............................. B01D 27/06
[52] U.S. Cl. ........................ 210/346; 210/437;
210/486; 210/488; 210/497.2; 210/498;
29/163.8; 55/257.6; 55/259; 55/527; 55/DIG. 5

[58] Field of Search ............ 210/346, 420, 437, 456,
210/457, 486, 487, 488, 497.01, 497.2, 498;
29/163.6, 163.8; 55/320, 325, 332, 476, DIG. 5,
257.6, 259, 315, 525, 527

[56] References Cited

U.S. PATENT DOCUMENTS

| 2,604,994 | 7/1952 | Vocelka | 210/346 |
| 4,443,233 | 4/1984 | Moran | 55/259 |
| 4,726,900 | 2/1988 | Keskinen et al. | 210/498 |
| 4,728,423 | 3/1988 | Kuwajima | 210/346 |
| 4,801,379 | 1/1989 | Ehrsam et al. | 210/498 |
| 5,112,503 | 5/1992 | Raifman | 210/346 |
| 5,200,072 | 4/1993 | Frejborg et al. | 210/498 |
| 5,259,512 | 11/1993 | Czerwoniak | 210/498 |
| 5,271,838 | 12/1993 | Rahimi et al. | 210/486 |

Primary Examiner—Robert A. Dawson
Assistant Examiner—W. L. Walker
Attorney, Agent, or Firm—William G. Rhines

[57] ABSTRACT

Embodiments of this invention include pressure differential barrier members for separating selected substances from fluid, gaseous and/or liquid, and methods of making same. They include separation material which, with respect to the fluid to be treated, is pervious and exhibits desired separation capabilities. They may also, at least in part, include material which is substantially impervious to the fluid. They include bridges spanning flow paths to form lateral flow paths, and they may also include flow paths that are unbridged. All flow paths through such embodiments are either through structural elements which themselves have desired separation capabilities or are occupied by separation material that is pervious to the fluid being treated and is of such desired characteristics. By this means, it is possible to finely control structural parameters of the device and therefore the results of the process of separation which are affected by them, such as the separation media surface area presented to the fluid, the volume of separation material through which the fluid may pass, and whether and the extent to which the fluid passes transversely through the separation material or flows linearly along relatively long channel passageways therein.

66 Claims, 6 Drawing Sheets

FLUID SEPARATION DEVICES AND METHODS OF MAKING SAME

BACKGROUND OF INVENTION

Various types of devices are useful to disassociate selected substances from moving streams of fluid, gaseous or liquid, by which they are being carried. Filters and catalytic converters are examples of such devices, toward which the present invention is directed. Filters, for example, may be used to treat exhaust discharges from furnaces, internal combustion engines, or other combustion sources, which contain substances in particulate form. The offensiveness and harmfulness of discharging them into the atmosphere are well known. Such substances may be in the form of liquids and/or solids suspended in a gas (in which case, they are generally classified as "aerosols") or in a liquid, and may be relatively small in size. Although the features of the present invention can be beneficial in many, of not all substance separation applications, they can be particularly advantageous when applied to such fields as those of filters, catalytic converters, odor suppressors, toxic constituent removal devices, and the like.

Typically, such devices are housed in some kind of chamber, which optionally may be a closed container through which the fluid that is to be processed passes. Having entered a filter element, for example, the fluid stream is caused to pass through filtration media, in and/or by which solid and/or liquid particles or other constituents being transported by the fluid are retained. Retention may be by mechanical entrapment by the filtration medium of the particles that are to be filtered out. In that case, the size of the material filtered out will be a function of the size of the pores or passageways through which the fluid can pass. With some filtrates, processing principles other than mechanical entrapment may be utilized. For example, some aerosols, such as the exhaust from a diesel engine, include comparatively large amounts of fine, particulate matter, liquid as well as solid, in suspension. Such suspended matter tends to stick to surfaces with which it comes into contact. Thus, filters for such applications, in addition or alternatively to mechanical entrapment, may be made capable of retaining desired substances from the fluid stream by providing contact surfaces to which such substances may adhere, and by enhancing the accessibility of those surfaces to the fluid. To that end, relatively long passageways may be provided by which, for the most part, fluid passes through, rather than transverse to, the separation medium. In a unit containing fibrous separation material, for example, such passageways may be made to be substantially parallel to the general axial orientation of the constituent fibers. Either process and the structures adapted therefor, as well as still other devices, may also provide means for causing separation of desired constituents through chemical reactions, as by coating the surface of the filtration or other separation material with reactive substances, as in the case of odor suppressors and catalytic converters.

The separation of substances from very hot fluids, particularly those bearing a proportionally high fraction of fine matter, can also impose limitations on the physical properties of the separation materials. There have also been various attempts to produce suitable devices which may be cleaned for reuse so as to extend their useful life, for example, by "back-flushing" or the combustion of materials they have entrapped. This may occur at temperatures which are much higher than those encountered by the device in operation. Constituent materials that are suitable for such thermal environments may be difficult to form and retain in a shape or configuration that renders them capable of performing their desired separation functions. Thus, ceramic materials, while desirable in some circumstances because of their heat and chemical tolerance, have presented limitations as to how they could be formed into separation bodies. While they are susceptible to being formed into monolithic, solid bodies, they are inherently brittle and otherwise liable to break or deteriorate under physical stresses of the type regularly encountered in use. Other factors, such as the necessity to machine or die form in order to produce desired shapes, have added to these objections. Some materials, such as ceramic fibrous yarns or felt-like sheets, are tolerant thermally of the range of temperatures encountered in such applications and are capable of being formed more easily into desired shapes. Similar limitations also apply with respect to separation devices that are used in other treatments of fluid carrier media. For example, a catalytic converter typically may be exposed to a stream of hot gas or other fluid, as may also devices for deodorizing fluids. Even though some such applications do not involve very high temperatures, high efficiency and volume capability, with assurance that virtually all of the material passing through the device will be effectively treated, are desired characteristics which they have in common with devices of the type herein before described, and therefore they present many of the same problems. Further, the operation of devices at elevated temperatures and/or in chemically aggressive environments frequently requires that the separation media be used efficiently to minimize the cost of the filter.

Accordingly, it is an object of this invention to produce fluid treatment devices that are capable of removing desired substances from suspension in fluids, liquid as well as gaseous.

Still another object of this invention is to produce devices that satisfy one or more of the other objectives set forth herein and are tolerant of comparatively high temperatures.

Yet another object of this invention is to produce devices that satisfy one or more of the other objectives set forth herein and may be easily formed into desired shapes.

A further object of this invention is to produce devices that satisfy one or more of the other objectives set forth herein and have high flow-through volume capabilities.

Another object of this invention is to produce devices that satisfy one or more of the other objectives set forth herein and exhibit structural stability and durability in a wide variety of environments.

Yet another object of this invention is to produce devices that satisfy one or more of the other objectives set forth herein and are adapted for regulating the flow of fluid therethrough as between being transverse to the constituent separation material, or along elongated travel paths therethrough.

Still another object of this invention is to produce devices that satisfy one or more of the other objectives set forth herein and exhibit structural stability and durability in a wide variety of environments.

Another object of this invention is to produce devices that satisfy one or more of the other objectives set forth herein and make use of a high percentage of the separation media.

Still another object of this invention is to produce devices that satisfy one or more of the other objectives set forth herein and minimize the pressure drop of the fluid in passing through the device.

STATEMENT OF INVENTION

Desired objectives may be achieved through practice of this invention, embodiments of which include pressure differential barrier members for separating selected substances from fluid, gaseous and/or liquid. Such members include separation material that is pervious to the fluid, exhibits desired separation capabilities, and is otherwise adapted to the environment in which it is to be used. They may also, at least in part, include material which is substantially impervious to the fluid being treated, to provide desired structural and other design characteristics to the barrier member. They include bridged openings, the bridges of which form lateral flow paths beneath their spans. They may also optionally include flow paths that are unbridged. All constituent material of the barrier that is not itself pervious to the fluid being treated and of desired separation characteristics has juxtaposed to it separation material that is pervious to the fluid being treated and is of such desired characteristics. Thus, although optionally, in some cases, pervious structural portions of the barriers may perform separating functions, in all embodiments, all other openings, at least some of which are bridged openings in which lateral flow paths are formed by and out from under the bridges, are substantially entirely covered by such separation material. By this means, the only paths for the passage of the fluid through the barrier member are via separation material. In addition, it is possible to finely control structural parameters of the device and therefore the results of the process of separation which are affected by them. Those parameters include regulation of the surface area presented to the fluid, the volume of separation material through which the fluid may pass, and whether and the extent to which the fluid passes transversely through the separation material or flows linearly along relatively long channel passageways therein to cause the desired separation of constituents from the fluid as it passes through the separation materials.

DESCRIPTION OF DRAWINGS

This invention may be understood from the descriptions herein set forth, and from the accompanying drawings in which.

DESCRIPTION OF PREFERRED EMBODIMENTS

Although some of the descriptions herein presented of embodiments of this invention will be in terms of their being for the purpose of filtration, it is to be understood that this invention may be practiced in a wide variety of other applications as well. These also include, (without limitation) catalytic converters, odor suppressors, toxic removal devices, and the like, as well as other structures to separate selected substances from a fluid carrier, such as liquids and/or a gas, by which those substances are being borne. Thus, for example, in certain applications, fibrous yarn-like structures may be the form, and ceramic the material, best suited for the separation media as described. However, other forms such as sheets, discs, monoliths, strips, etc., and other materials such as ceramic fibers, fiberglas, textiles, "foamed" plastics, etc. may be appropriate. In all cases, the constituent materials may be with or without platinum, activated charcoal or other such active materials, where absorption by surface reactions, or other comparable phenomena are to be utilized as a means to separate substances as desired from such a fluid, as in the case of catalytic converters, toxic gas treatment devices, and odor suppressors. Combinations of materials may also be used, such as coated yarns or the like, as means to introduce desired materials which reinforce and/or protect, or are reactive, absorptive or otherwise suited to the processes in which the resulting structure is to be used. In that connection, it is to be understood that the term "substance(s)" in this context of their separation, removal or disassociation from fluid by which they are being borne is to be construed in the broad sense of any substance being borne by the fluid as well as any constituent of the fluid itself, whether or not in the form of a separate and distinct physical entity. Thus, although particles and droplets are included, as are other forms of solids and liquids, so also are constituents of the fluid itself. Thus, a toxic gas constituent of a gaseous fluid is an example of a "substance" within this meaning even though, for example, it may not be in a form which is separately identifiable, as by visual means. Thus, within the contemplation of this invention, the "separation", "removal" or "disassociation" of a "substance" is intended to mean by whatever means, physical, chemically reactive or neutralizing, or otherwise, any constituent of the fluid being treated including (without limitation) any which is a chemically combined or otherwise integrated constituent of that fluid as well as any being transported by it, may be separated from the fluid itself. In this context, it is further to be understood that by "substantially" as used herein is meant that although the condition or state of affairs to which it refers is perhaps not literally totally so, any shortfall therefrom is of not of significantly material adverse effect.

Within the contemplation of this invention, the actual separation of substances from the fluid to be treated is achieved by the use of "separation materials" by which, in the context of this disclosure, means any material which satisfies the criteria set forth herein and, like the other constituent material of relevant parts of embodiments of this invention, are acceptably stable against the physical, chemical, thermal, and other relevant characteristics of the environment in which the device is to operate, and of the fluids and matter to which they will be exposed. Other criteria may as well be relevant to the selection of such material, such as physical characteristics which enable the separation media to be formed into and retained in desired shapes, sufficient permeability to the fluids to which it is to be exposed to enable fluid to pass through the separation media at desired rates while separating desired substances from the fluid as it passes, etc., all as will be apparent to those skilled in the cognizant arts. Structures according to this invention and structures ancillary to them may be so configured and/or positioned, as in a housing, or otherwise situated, to provide desired strength, protection, and structural integrity in the intended context, as well as to contain and direct the flow of fluid to and away from the devices described. For example, a metal, can-like outer container and/or an inner plenum may be used, although the use of such structures and/or containment housings or their exact nature or design are not necessary or critical to the practice of this invention.

Figures 1, 2:
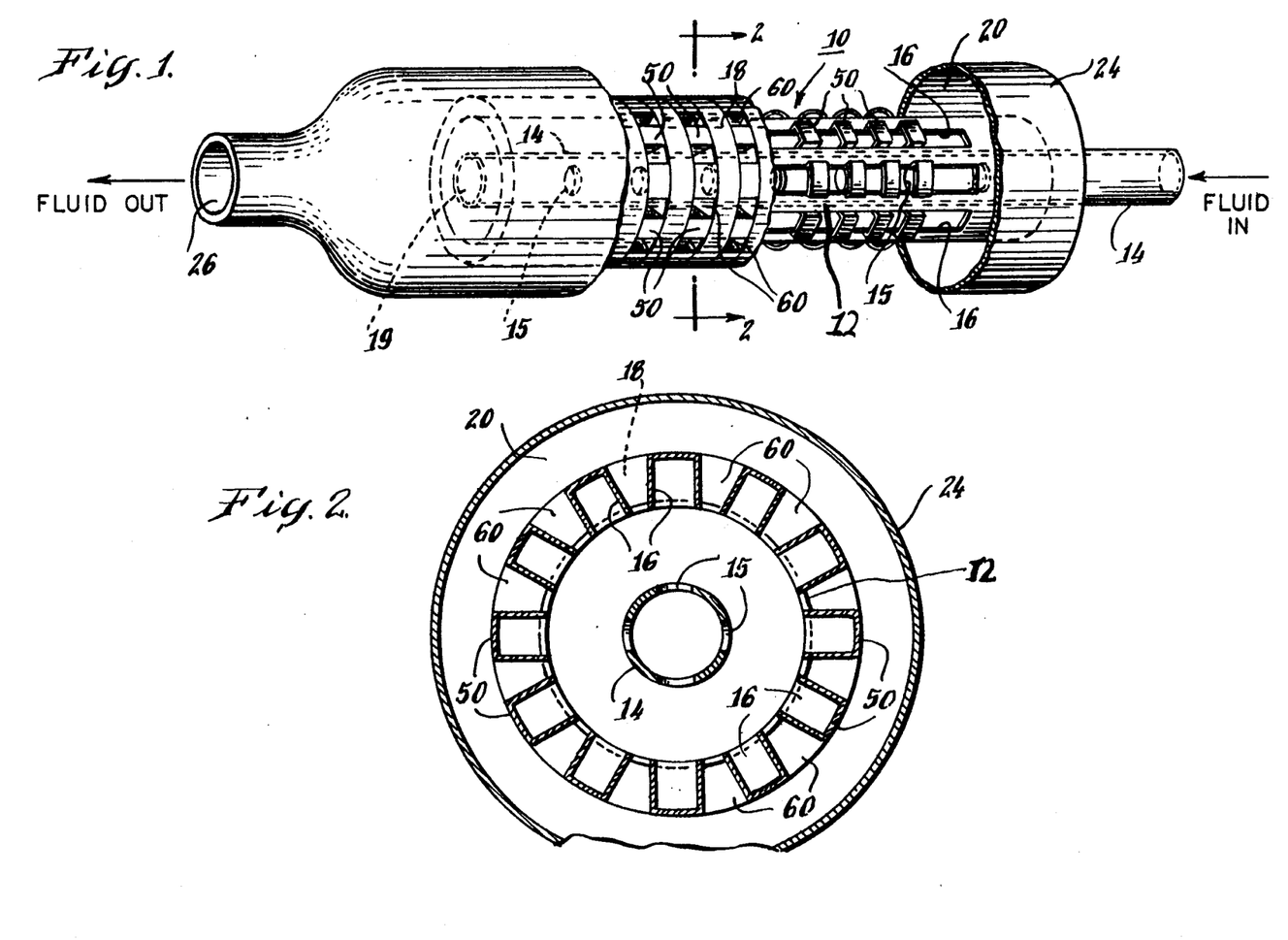
FIG. 1 is a cut-away perspective view of an embodiment of this invention.
FIG. 2 is a view of a cross-section taken through line 2—2 as shown in FIG. 1.

Referring first to FIG. 1, there is depicted, in cut-away perspective view, a separation device which includes a pressure differential separation barrier member 10 which embodies this invention. It includes an inner hollow cylindrical tube 14 which has a fluid ingress means at one end and a blocking means, shown in the form of an end cap 19, at the opposite end. As shown in that Figure, the tube 14 includes holes 15 which allows fluid passing through it with access to the pressure differential separation barrier member 10.

Although shown as a cylinder that is fed from the inside, it will be clear from what follows that this is but one of the many configurations which embodiments of this invention may take. Thus, the flow path for fluid to be treated might alternatively be from the outside of the device to the inside, and the shape of the device and its constituents might be any among a large number of different shapes, such as with square, rectangular, elliptical or other cross-sectional configurations which are geometrically regular and/or irregular. Further, the barrier itself may be a structural entity in itself, or in the form of a panel or the like which is installed, for example, within a duct or other conduit across the fluid flow path so as to interdict the flow of fluid. The device may include support ribs 12 that is interposed between elongated slots 16 and may be made from material which are substantially impervious to the passage of the fluid therethrough. Thereby, in this embodiment, substantially all of the fluid passing through the device must pass through such openings 16. The openings 16, although shown in FIGS. 1, 3 and 5 through 10B as being in the form of slots, may also be of any of a number of geometric shapes, sizes and proportions. For example, as is shown in FIG. 3, the openings may be more or less in the shape of rectangles, but as will be apparent presently, they might be round, oval, square, or any other regular or irregular geometric shape.

Figure 3:
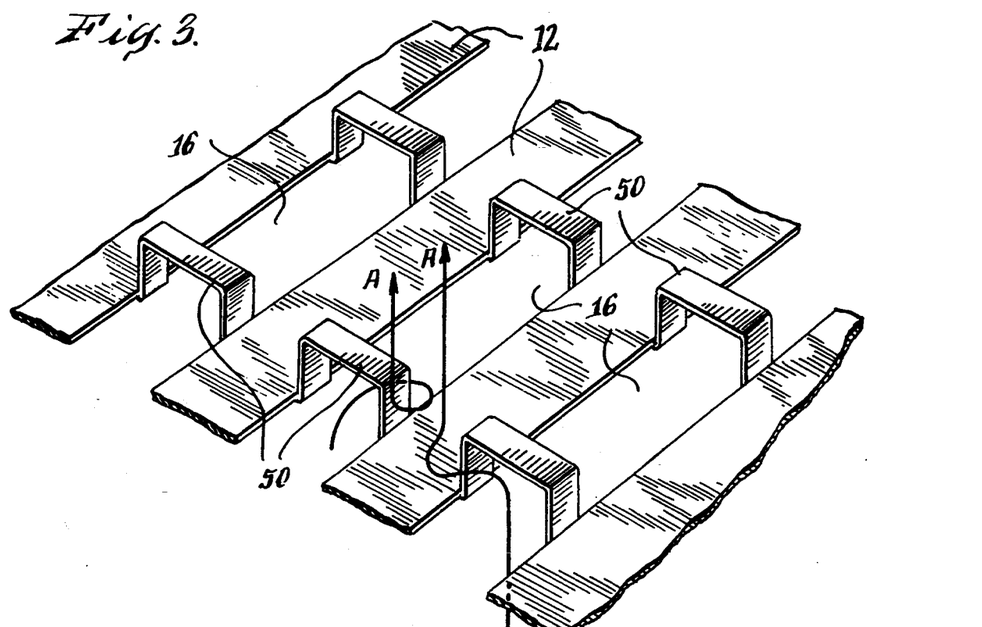
FIG. 3 is an enlarged perspective view of a portion of the embodiment of this invention shown in FIGS. 1 and 2.
Figure 5:
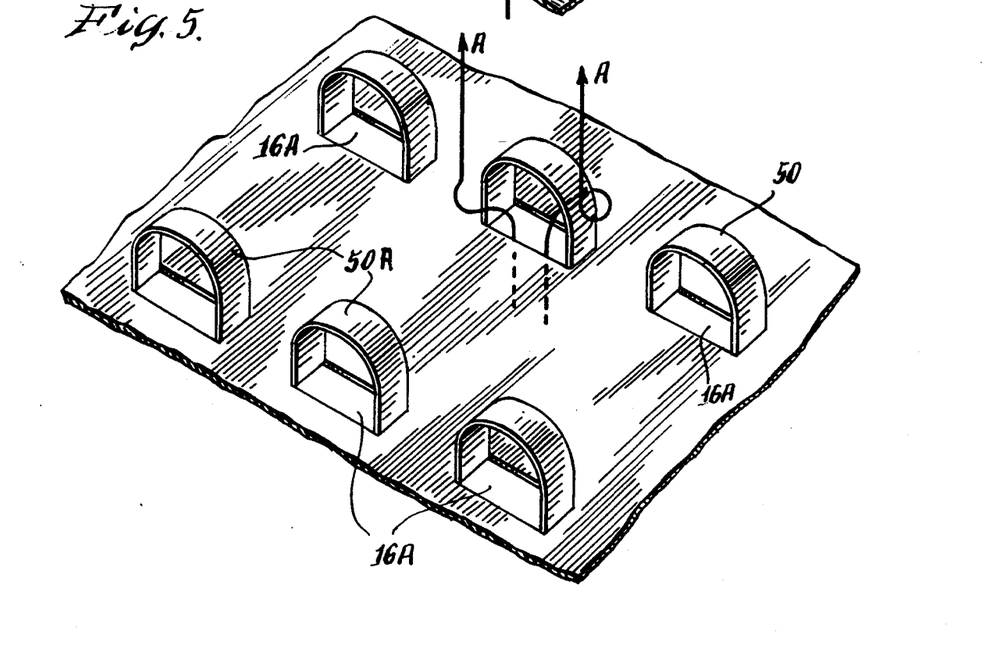
FIG. 5 is an enlarged perspective view of a portion of an alternative the embodiment of this invention to that shown in FIG. 3.
Figure 6:
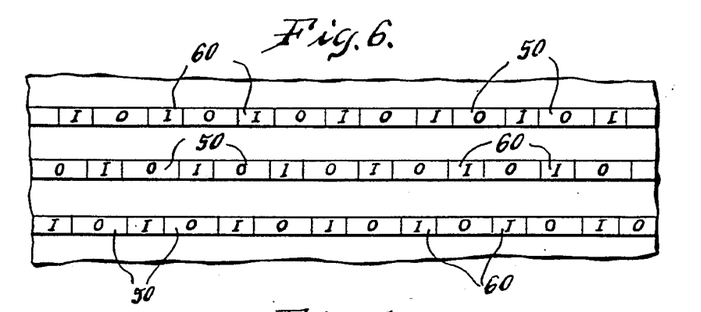
FIG. 6 is a schematic view relating to one embodiment of this invention.
Figure 7:
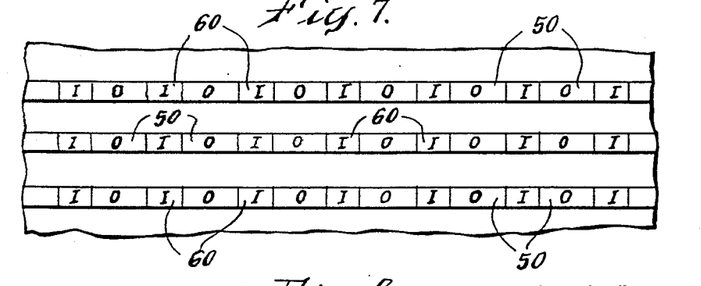
FIG. 7 is a schematic view relating to another embodiment of this invention.
Figure 8:
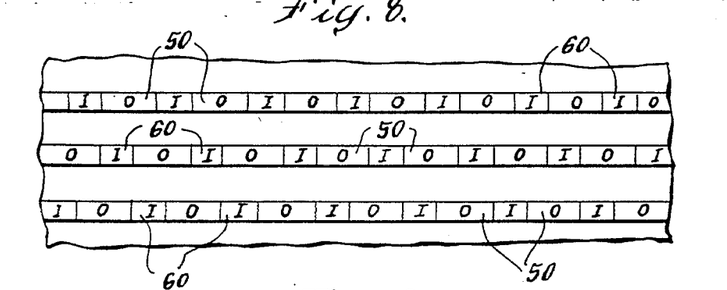
FIG. 8 is a schematic view relating to yet another embodiment of this invention.

As is shown in FIG. 1 and in greater detail in FIGS. 2, 3, and 5, each opening 16 (or 16A, in FIG. 5) is traversed or crossed over by at least one bridge element 50 in this embodiment. Each such bridge element 50 is also made from material which is substantially impervious to the fluid. Each end of each bridge 50 is continuous with a support rib 12 to ensure imperviousness to the fluid where the bridges join the support ribs 12. This may be achieved by a variety of known means, such as welding, brazing or otherwise adhering one to the other. A preferred method is by forming the bridges and the openings simultaneously from the same sheet metal or other appropriate stock, by punching or other known cutting and forming techniques, with or without associated bending steps, to create the desired end shapes, dimensions, and configuration of plenum wall, openings, and bridge members.

Figure 4A:
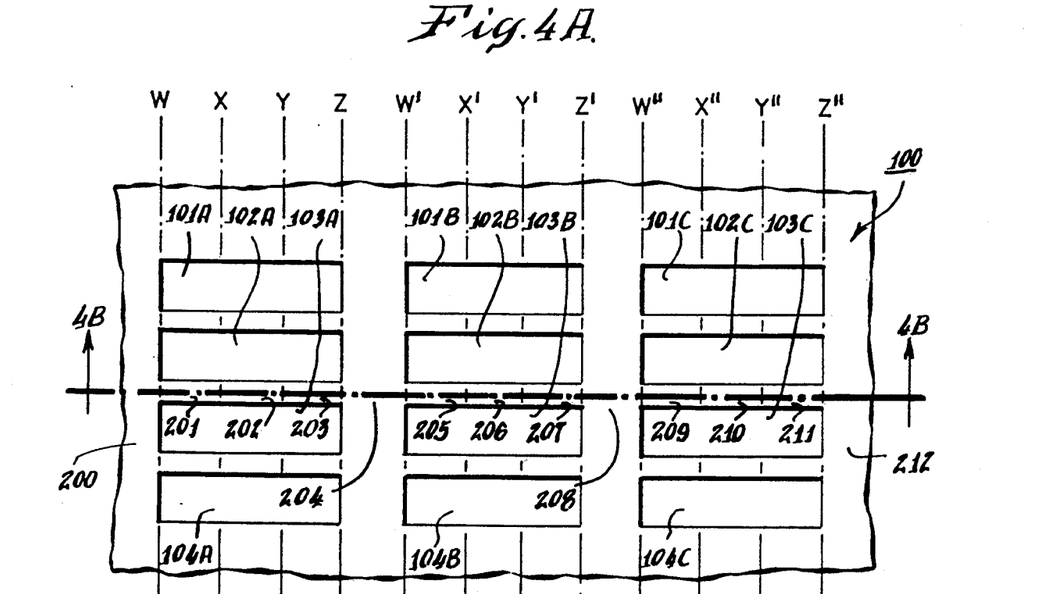
FIG. 4A is a top plan view of a forming blank for making embodiments of this invention of the type shown in FIG. 3 after it has been formed and before it is bent into final shape.
Figure 4B:
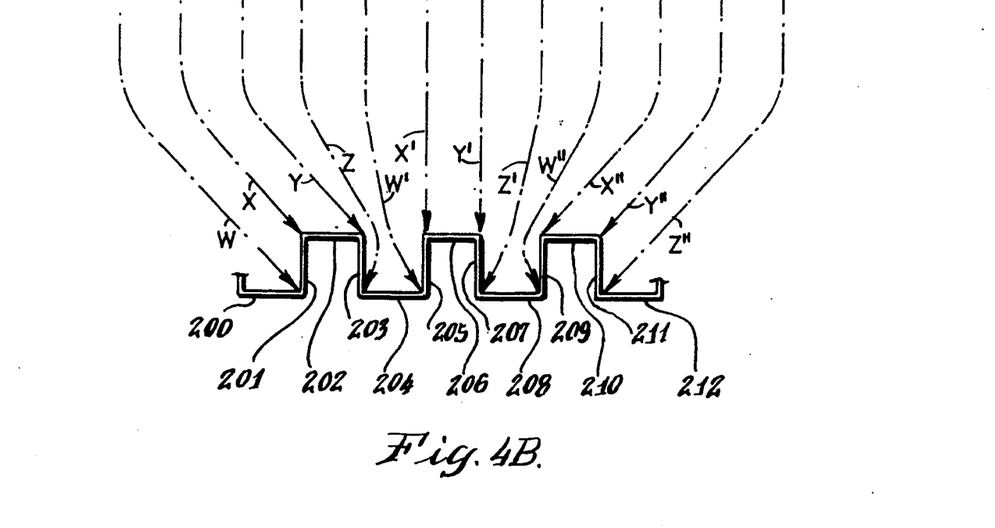
FIG. 4B is a cross-section taken along line 4B—4B as show in FIG. 4A after bending of the section.

One such method, being one particularly applicable to making embodiments of the type shown in FIGS. 1 and 2, is illustrated in FIGS. 4A and 4B. Referring first to FIG. 4A, there is depicted a forming blank 100, made from material which is appropriate for its intended use, such as sheet steel. Parallel columns of elongated openings 101A ... 104A. 101B ... 104B, 101C ... 104C, etc. (shown oriented vertically in FIG. 4A), are made in the forming blank using punch-out or other known per se means for hole forming, with corresponding among them (e.g. . . . 101A, 101B, 101C, etc.) forming, with each other, rows which are at right angles to the columns (i.e., are shown oriented horizontally in FIG. 4B). This operation leaves elongated webs (e.g., 204, 208, etc., which later will become support ribs corresponding to those shown as "12" in FIGS. 1, 2 and 3) between juxtaposed pairs of openings in adjacent columns. These webs are made from the same material as, and are continuous with, the remaining ribbons of material of the forming blank that are located between each adjacent pair of holes (e.g., between 101A and 101B, 102B and 102C, 103A and 103B, etc.) in each row. As may be seen from FIG. 4B, the blank so formed may then be bent along the bend lines W ... Z, W' ... Z', W" ... Z", etc., to form each of the ribbons into three segments which are continuous with each other and with the webs (204, 208, etc.) in the forming blank. The explanation which follows is, of course, illustrative of the result which occurs to all such web portions, although the description is particularized to the webs and intervening remainders of the forming blank that are positioned between openings 103A, 103B, and 103C on the one hand, as shown by the section line 4B—4B taken through FIG. 4A.

The results of the described bending process is shown in FIG. 4B. Bends W and Z orient the end portions of a ribbon vertical to the plane of and continuously at their lower ends with what will become segments 201 and 203 respectively. Bends X and Y produce segment 202 from the mid-portion of that ribbon web, which is oriented parallel to the plane of the forming blank 100 and is at right angles to the tops of segments 201 and 203. As is shown in FIG. 4B, these segments are continuous with each other and with the adjacent web portions (200, 204) of the forming blank which remain after the openings were cut in it. As is also shown in FIGS. 4A and 4B, similar bends W', X', Y', and Z' produce the bridge element which is made up of elements 205, 206, and 207 that are continuous with each other and with the webs 204, 208; bends W'', X'', Y'', and Z'' produce the bridge whose elements are 209, 210 and 211 and are continuous with each other and with webs 208, 212; and so forth. The forming blank so prepared may be then formed onto itself into a round or ellyuptical cylinder or the like, by abutting and joining its side edges so that the tandem rows of bridges go circumferentially around the barrier so formed while the columns of bridges extend longitudinally of the barrier.

The cross-sectional configuration of the bridge elements may be more or less that of an inverted "U" as shown as "50" in FIGS. 1–3, and 10B, or of an arch as shown as 50A in FIG. 5, or of any other shape which has the effect of spacing the surface of the bridge element which faces the opening which it traverses apart from the surface surrounding that opening, thereby forming lateral openings beneath the bridge elements through which fluid which may divert laterally and then continue to pass through the device. Such flow baths are shown in particular in FIGS. 3 and 5. It is to be noted, too, that the bridge elements 50 need not be of the same width dimensions throughout. For example, in the inverted "U" configurations shown in FIG. 3, each upright may be wider at its base than it is where it joins an end of its span, for example, to impart added strength to the bridge element against lateral deflection. Similarly, the "arches" shown in FIG. 4 may be narrower at the top than at each base, for similar or other reasons. Of course, the configuration of the associated opening may also vary either independently of or as a reflection of such contour width variations in the bridge elements, for example where the bridge elements are merely deformations of material punched from a metal sheet to form the opening which underlies it. Further, there may be more than one bridge element per opening (as is the case with the embodiment shown in FIG. 1), and/or more than one opening traversed by any single bridge element. In all such cases, as well as others which will be apparent to others skilled in the arts given these teachings, it will be apparent that such variations nevertheless constitute practice of the present invention.

The cross-section of the embodiment of this invention shown in FIG. 2 is taken along line 2—2 in FIG. 1, illustrating the relationship in situ between the various elements of that embodiment, including an (optional) outer plenum 24. In particular, the inverted "U" bridge elements 50 are shown arrayed circumferentially transverse to the associated slots 16 and in continuity with the associates support webs 12, with the open end of each such "U" facing a slot 16. The outside of this region of the device is as has been shown in greater detail in perspective in FIG. 3. From these figures it may be understood that separation material 18 of the type which meets the criteria set forth above may be placed at right angles to the openings 16, so that it is oriented circumferentially atop the support ribs 12 and occupies the spaces between the circumferential rows of bridge elements 50 at least to the level of the "top" of the bridge elements. A way to do so in the embodiment shown is by winding separation material, typically in the form of yarn-like continuums, strips, ribbons, preformed masses, or the like, into the spaces between circumferential rows of bridges. An advantage of this is that simultaneously, that process will also cover the portions of the column-oriented slots 16 which are located under the axially aligned columns of bridges parallel to the support ribs 12. Another advantage is that it can be carried out automatically by revolving the device axially while the continuums of separation material are positioned in place. It should be noted that this approach still leaves the spaces 60 between the uprights of adjacent bridge elements in the same circumferential row unoccupied by separation material. However, in this embodiment, each such void or space 60 is blocked at two of its sides by the impervious material of an upright of each of two adjacent bridge elements and at the bottom by the impervious material of the support rib 12. Therefore, the spaces 60 are available as egress paths for fluid, but only after the fluid has entered them via one or the other or both of the remaining two sidewalls, both of which are formed by separation material. Of course, fluid might also enter them via the uprights or the floor to the extent any of them is made from pervious material, but in that case such material will have been chosen for its desired separation characteristics. Accordingly, in every case, every available flow path for fluid is occupied by separation material in one form or another, as a result of which fluid, whether via elements of the structure itself or via the lateral openings under the bridges, must traverse the separation material. This ensures that substantially all of the fluid passing through the device will have been substantially entirely treated by separation material as desired. Although not essential to the operation of embodiments of this invention, optionally, additional means, such as the outer plenum 24, may be provided to receive the treated fluid, contain it, and direct it toward disposal means. Although the treated fluid might be vented directly to the atmosphere (e.g.), that normally is not a usual or preferred practice, so to facilitate that, and/or to protect of the inner structure of the device and to facilitate its being mounted on associated equipment, such as a truck frame or engine, such an outer plenum structure 24 may be used, the interior of which may be spaced from the outside of the structure which it surrounds to provide paths for treated fluid to egress the device via the egress opening 26.

FIG. 5 demonstrates that a wide variety of other structural configurations and methods of making them may be utilized in the practice of this invention. In that Figure, there is shown a structural configuration which includes bridge elements 50A which have been formed by a simple punching operation on a forming blank 100 made from metal or other material which is appropriate for the intended application. Here, however, portions have not been punched out and removed. Instead, selected portions have merely been distended to form the desired bridge elements 50A. The holes 16A which remain when sides of the bridges 50A have been defined by slits cut through the forming blank 100 and the bridges then pushed out from it without the continuity of their ends with the main body of the forming blank 100 having been disrupted, provide the flow paths for the passage of fluid. This method may be used to produce structures without openings between circumferential rows of bridges of the type shown in FIGS. 1-3. It should also be noted that in embodiments of this invention it is not necessary that the bridges be in orderly "rows" and "columns" since, as will be apparent from FIGS. 6-9 as well, any of a wide variety of regular or random configurations will also work. Of course, other considerations, such as making it easier to install separation material so as to cover the lateral bridge openings and other flow paths might make it advantageous to preserve alignments of bridges in the direction of their bridging spans, as is shown in FIGS. 3 and 5–9. In some cases, staggering of the bridges may be particularly advantageous, since this can provide greater versatility in regulating the length and nature (i.e., transverse or longitudinal) of flow paths from beneath a given bridge, so that the distance and direction of flow through interposed separation material from under a bridge to voids between bridges in a next adjacent circumferential row of bridges or directly outward from the device may be reduced as desired down to nearly nothing.

From the foregoing, it is to be understood also that the placement of the bridge elements, regardless of their structure or dimensions, is not necessarily in the "in-line" configuration shown in FIGS. 1 or 3, or even of FIG. 5. Thus, in addition to the "aligned" orientation shown in the foregoing Figures, the bridge elements may be arrayed in any of a wide variety of configurations. As example, they may be arranged in a staggered configuration such as that shown in FIG. 6, or in a bi-directionally linear orientation such as that shown in FIG. 7, or in random arrays such as that shown in FIG. 8. In each of these Figures, the blocks marked "i" represent the location of a bridge element (and therefore of an inlet path beneath the element) and into the separation medium. Correspondingly, those marked "o" represent the regions between the bridges which, usually, are occupied by a void between the upright walls of adjacent bridge elements (and therefore of an outlet pathway for fluid which has been subjected to the separation process as described above).

Figure 9:
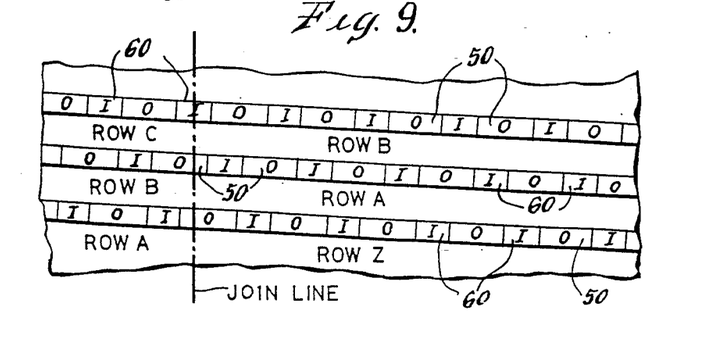
FIG. 9 is a schematic view relating to still another embodiment of this invention.

The configuration shown in FIG. 9 presents a different variation. As depicted, each of the circumferential rows of bridges has been designated with an identifying letter: e.g., "A", "B", "C" ... "Z". However, the rows have been oriented so as to form a continuous helix. As shown, the helix has a pitch of one, but of course the pitch could be of any number, depending upon the desired design parameters. A way of achieving these configurations is to make a desired basic configuration of bridge elements in a forming blank. Then, instead of abutting one end of a given row with the other end of the same row when the two edges of the forming blank are abutted, one end of a given row is abutted to the opposite end of the next adjacent row (if the helix is desired to have a pitch of 1), or the row next adjacent but one (if a 2 pitch helix is desired), etc. An advantage of such configurations is, as previously noted, is that the separation material may then be laid in as continuous helices of one or more layers on top of each other, and/or as more than one or more parallel strands, depending upon the number of filaments in the helices.

Figure 10A:
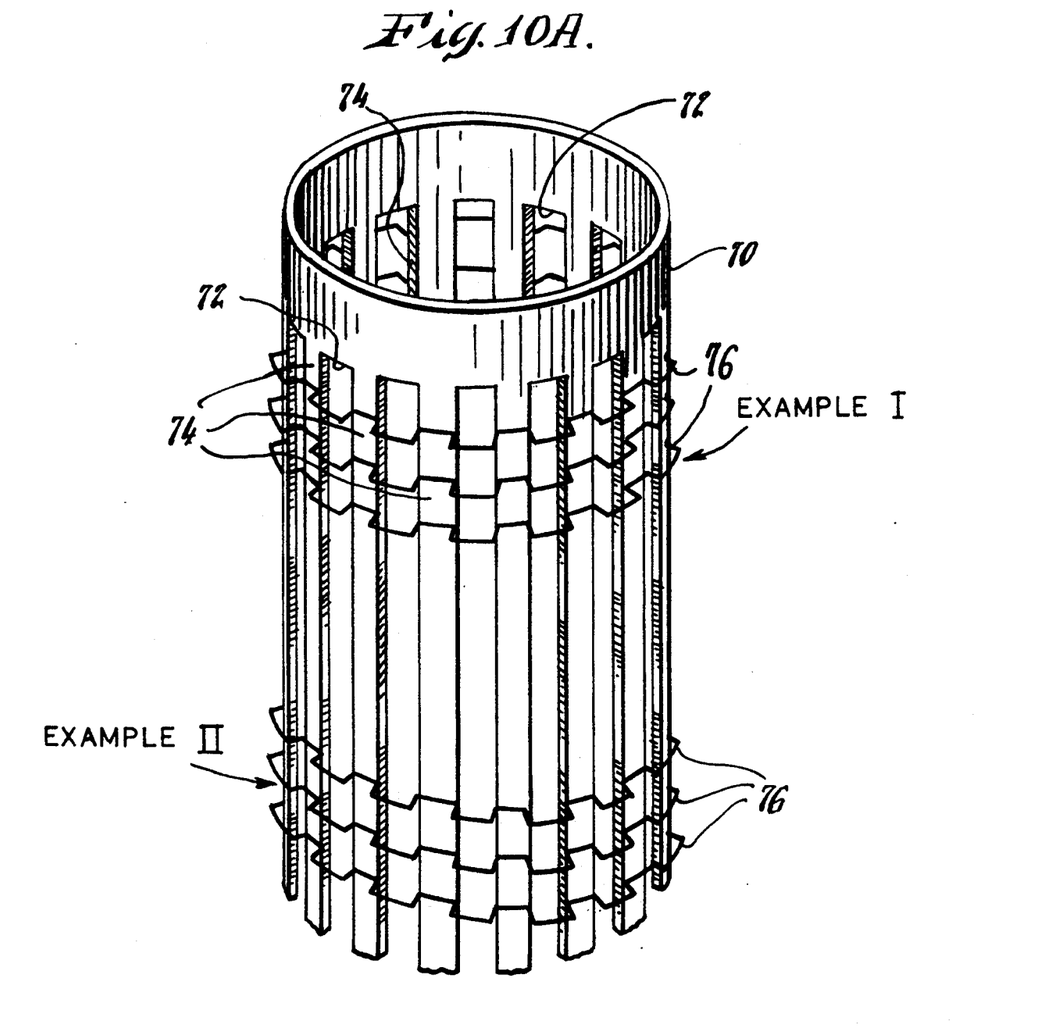
FIG. 10A is a plan view showing other embodiments of this invention.
Figure 10B:
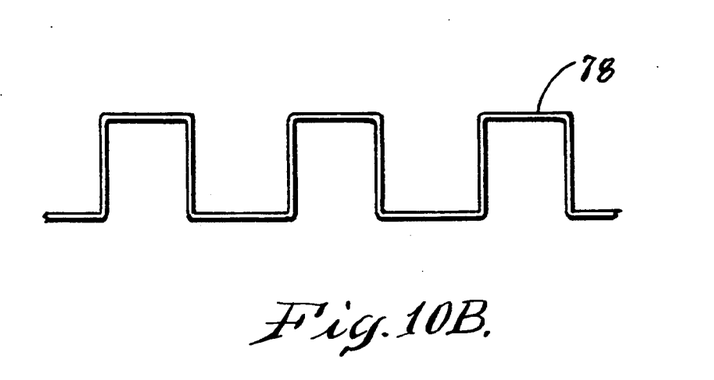
FIG. 10B is a side view of a constituent of the embodiment of this invention shown in FIG. 10A.

A further illustration of the wide range of embodiments which this invention may take is shown in the examples depicted in FIGS. 10A and 10B. FIG. 10A shows a base component 70 that is formed by making elongated openings 72 through a forming blank that are interposed between corresponding elongated ribs 74. Here, however, a heavy wire, which may be of the type 78 shown in FIG. 10B or of any of a wide variety of cross-sectional geometric shapes and sizes, is used to form the bridge elements 76. A desired characteristic of this approach is that the bridge element stock may easily be formed or shaped in any of a number of directions. This may be done automatically or manually, as by first forming a forming blank which has had the openings cut through it into a cylinder, and rotating the cylinder to the outside of which the bridge element medium 76 has been applied and adhered, as by spot welding or other known per se means. Such operations may be combined, or as tandem or concurrent operations with the application of the separation medium and/or other steps toward completion of the final product. Thus, as illustrated in FIG. 10A, such a "wire" may be wound in simple end-abutting rings circumferentially about the periphery of the formed blank of the type shown as example "I", or as sequentially stepped peripheral rings of the type shown as Example "II". Further, whatever exact configuration is chosen, several "ends" of such "wire" may be applied simultaneously, and may optionally be simultaneously accompanied by, or done in tandem with, the application of interposed separation material, thus speeding up and simplifying production of the end device.

As to all embodiments of this invention, to the extent one or more constituents of a device (e.g., the bridges) are not themselves made from material which, itself, has acceptable separation characteristics, separation material must substantially entirely cover every travel path for fluid for the separation device to be substantially entirely effective, whether those paths are via openings between adjacent bridge elements (e.g., 16 in FIG. 3) or through the vertical and lateral openings under the bridge elements, and whether such flow paths lead directly to the space surrounding the device or through voids in between the facing upright walls of adjacent bridge elements (e.g., 60 in FIG. 1). In some cases it is possible to achieve these ends by installing separation material banked up against the bridge element lateral openings between such circumferential rows while also covering any openings in the locations therebetween. However, normally, such inter-row spaces should be substantially entirely occupied by separation material, particularly to ensure structural integrity and stability against collapsing away from the bridge element lateral openings. It should also be noted that separation material, for example in the form of a continuous yarn or strand, may be shifted from one inter-row circumferential slot opening to another, crossing other elements of the structure such as the tops of the bridge elements. This facilitates the installation of such material as when it is being wound onto a rotating core. Such separation material may also over fill those spaces, and typically may cover the entire core structure (including the bridge element span sections). Further, it is possible in embodiments of this invention for bridge elements to open away from, rather than toward, the direction of fluid flow. In such cases, the separation material will also be located between the bridge elements.

Figure 11A:
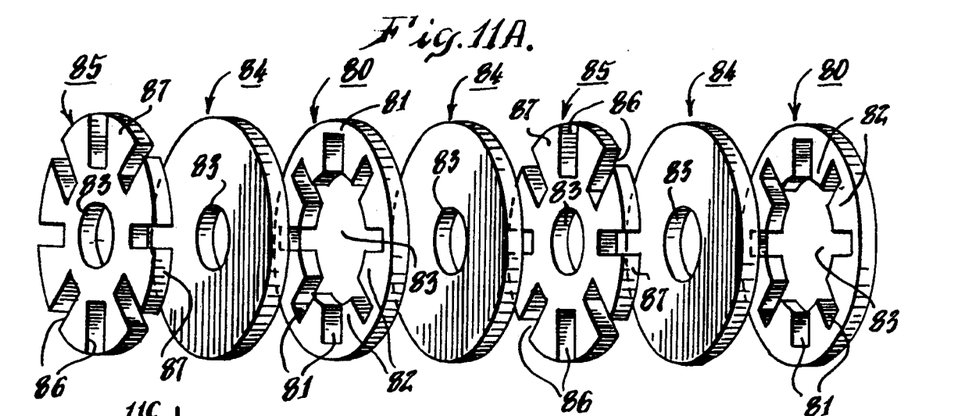
FIG. 11A is an exploded view of another embodiment of this invention.
Figures 11B, 11C, 11D:
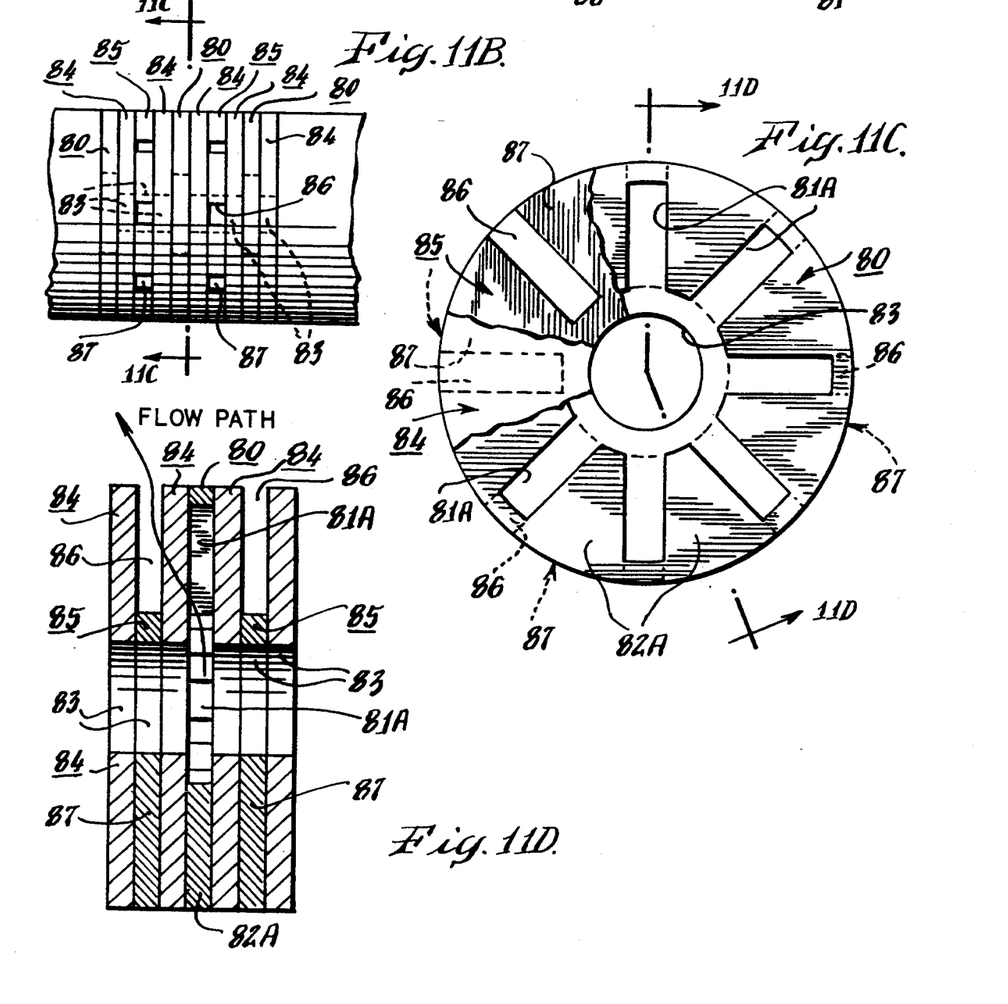
FIG. 11B is a side view of the embodiment of this invention shown in FIG. 11A.
FIG. 11C is a cross-sectional view taken along line "11C—11C" in FIG. 11B.
FIG. 11D is a cross-sectional view taken along line "11D—11D" in FIG. 11C.

FIGS. 11A through 11D illustrate how the principles of this invention may be applied to an even wider variety of materials and structures. FIG. 11A shows, in exploded view, components of an embodiment of this invention that is adapted for use with materials such as ceramics. It includes ceramic discs 80, 84, 85 that are to be abutted side to side to form a stack. Each of these discs has an internal aperture 83 which, collectively with other such apertures in the assembly hereinafter described, create a central fluid flow conduit. Any or all of these discs optionally may be made from material that is pervious to the fluid being treated so as to render them into a separation media, but "toothed" discs (e.g., 80, 85) usually they will be made from material which is impervious to the fluid. The discs 80 have internally oriented "teeth" 82 with "grooves" 81 between them. The grooves 81 are, in cross-section, analogous to the bridges previously discussed, both in structure and in function. The discs 85 have externally oriented "teeth" 87 with "grooves" 86 between them. These grooves 86 are, in cross-section, analogous to the voids 60 previously discussed, both in structure and in function. The discs 84, as shown, do not have such teeth, but, instead, are uninterrupted both at the circumference of the interior hole 83 and that the outer circumference of each disc 84. The interior hole 83 of the discs 84 preferably are of the same diameter than the circumference described by the "tops" of the "teeth" 82 in the discs 80. However, those interior holes may be of a different diameter, as may be seen from FIG. 11C, which is a cross-sectional view of an assembly of such discs taken through the line "11C—11C" in FIG. 11B, a side view of a stack of such discs. The effect of this arrangement may be seen from FIGS. 11C and 11D. As a result of so forming these embodiments, bridged inlets (e.g., 81A) are created in the discs 80 which form part of the flow paths which extend (as is shown in FIG. 11D) through the surrounding separation material of the discs 84 and out through the outward facing spaces 86 in the discs 85, and thus are analogous to the bridged assemblies previously described and discussed. It should be noticed in particular that FIG. 11D, a cross-section taken through line "11D—11D" in FIG. 11C, shows this effect in that the portion of disc 80 that remains at the base of a "valley" 81A is shorter than the opposite "tooth" 82A, thus exposing the pervious wall of the adjacent discs 84 to the valley 81A as a flow path. The corresponding (albeit reversed) relationship of the discs 85 to the discs 84 should also be noted in this Figure since the overlap of inward facing "valleys" in discs 80 with outward facing "valleys" in discs 85 that the flow of fluid through the intervening separation materials of the discs 84 may be directed and regulated. Of course, the direction of flow of fluid might as well be reversed from that just described, i.e., it may be from the "valleys" 86 through the separation material of the discs 84 and out through the "valleys" 81. Further, it is also possible to eliminate entirely the intervening discs 84 of separation material by making either one or both of the discs 80, 85 of separation material and by having all "valleys" in either one juxtaposed substantially entirely throughout to the flat wall surface of a "tooth" of the other. It is also possible to eliminate entirely some or all of either discs 80 or 85, so long as in the resulting configuration each "valley" is juxtaposed to a solid facing wall of separation material; i.e., either of a "tooth" in an adjacent disc or of a surface of an adjacent solid disc.

Further, as illustrated in FIGS. 11A-11D, the constituent elements are shown as stacked, discrete discs, which may be held together in tight-enough surface contact for there not to be leakage between the discs, or which may be cemented or otherwise fused together. However, it is also possible to form the constituent elements from plates, discs or other configurations, which also may be made from material which is susceptible to being autogenously bonded, such as "uncured" ceramic "greenware" plastics, glass, or the like. Such units may then be stacked together in the desired configuration and "cured" as a whole the unit to cause the constituent elements to fuse into a monolithic, integrated mass. It is also possible, by known per se manipulation of the structure of the constituent elements, whether of ceramic, plastic or other materials, to create elongated channels through the separation constituents that are analogous to those described in the previously discussed embodiments of this invention. For example, such paths may be formed in the flat side surfaces of a disc (e.g., 84) that abuts the "valley" openings of an adjacent disc (e.g., 80).

From the foregoing, it will be apparent that embodiments of this invention may be made in the following steps. First a member is formed, at least a part of which includes material which is pervious to, and exhibits desired separation characteristics to the fluid being treated. The member usually (but optionally) may include material that is impervious to such fluid. It also includes "bridges" which span and redirect flow paths for the fluid laterally out from under their spans. The member may optionally include other flow paths, some or all of which are located between some or all of adjacent bridges. Separation material of desired characteristics is retentively positioned so as to cover all paths via which fluid may pass out through said lateral bridge openings and, (if any) said other openings. The bridged flow paths, and those other flow paths (if any), are so dimensioned and positioned with respect to each other and to said separation material as to form, together with such separation material, completed flow paths which traverse and/or otherwise pass through separation material to achieve desired separation from fluid flowing therethrough. As with other embodiments of this invention, the structure, composition, characteristics, configuration, size and orientation of these various elements may be in any of a wide variety.

Optionally, an outer collection plenum, usually spaced apart from the outermost peripheral surfaces of the inner core structure, may be positionally affixed to provide one or more directed egress paths for the treated gas as well as mechanical affixing means for retentively attaching such devices to associated equipment.

Thus, it is to be understood that the embodiments herein disclosed, discussed and illustrated are by way of illustration and not of limitation and that this invention may be practiced in a wide variety of applications and embodiments without departing from the spirit or scope of this invention.

I claim:

1. For use in apparatus for separating selected substances from a stream of fluid moving relative thereto by which said substances are being borne, a pressure differential barrier member comprising an array of bridges in which the bridges constituting each adjacent pair of bridges are spaced apart from each other and are joined by an interconnection means, and wherein, with respect to said array, the orientation of said bridges is along a common axis line, each of which bridges has side edges, each of which side edges occupies a plane that is substantially parallel to said axis line, and each of said bridges spans a bridged space that is open to the flow of fluid therethrough, each of said interconnection means is continuous with the adjacent pair of bridges between which it is located, and, together with the side edges of those bridges between which it is located, bounds a space that is open to the flow of fluid therethrough, the bridges and the interconnecting means therebetween are made from material whose physical characteristics include incompressibility sufficient to maintain spaced apart from each other to a predetermined extent bodies of separation material that are positioned on both sides of each of said bridges abutting substantially entirely the side edges said bridges, and separation material retentively positioned on both sides of each of said bridges abutting the side edges of said bridges and covering substantially entirely the access thereto under the side edges of the spanning portion of said bridge, whereby substantially entirely all fluid which passes through said bridged spaces flows through said separation material.

2. The barrier member described in claim 1 comprising at least two substantially parallel such arrays of bridges and other structural elements by which said arrays are positionally fixed in spaced-apart relationship with respect to each other, said arrays and said structural elements being selected from the group which, with respect to the fluid being treated and the substances selected to be separated therefrom, consists of (1) those which do not include flow paths for the passage of said fluid, (2) those which include flow paths for the passage of said fluid and themselves are able to separate said selected substances from said fluid, and (3) those which include flow paths for the passage of said fluid and themselves are not able to separate said selected substances from said fluid, wherein said barrier member also includes separation material through which will pass substantially all of the fluid which passes through the flow paths that are included in those among said arrays of bridges and said other structural elements which themselves are not able to separate said selected substances from said fluid.

3. The barrier member described in claim 2 wherein access to at least one bridged space in at least one of said arrays is via an elongated opening in said barrier member that also provides access to a bridged space in at least one other said arrays of bridges.

4. The barrier member described in claim 2 wherein said arrays of bridges are positionally retained in spaced-apart relationship to each other by means of structural elements of said barrier member with which they are in physical continuity as parts of a common physical entity.

5. The barrier member described in claim 3 wherein said arrays of bridges are positionally retained in spaced-apart relationship to each other by means of structural elements of said barrier member with which they are in physical continuity as parts of a common physical entity.

6. The barrier member described in claim 1 in the form of a tube.

7. The barrier member described in claim 2 in the form of a tube.

8. The barrier member described in claim 3 in the form of a tube.

9. The barrier member described in claim 4 in the form of a tube.

10. The barrier member described in claim 5 in the form of a tube.

11. The barrier member described in claim 6 wherein said array of axially aligned bridges is helically arrayed about said barrier.

12. The barrier member described in claim 7 wherein at least some of said arrays of bridges are helically arrayed about said barrier.

13. The barrier member described in claim 8 wherein at least some of said arrays of bridges are helically arrayed about said barrier.

14. The barrier member described in claim 9 wherein at least some of said arrays of bridges are helically arrayed about said barrier.

15. The barrier member described in claim 10 wherein at least some of said arrays of bridges are helically arrayed about said barrier.

16. The barrier member described in claim 1 wherein said separation material is in the form of one or more elongated continuums of fibrous material.

17. The barrier member described in claim 2 wherein said separation material is in the form of one or more elongated continuums of fibrous material.

18. The barrier member described in claim 3 wherein said separation material is in the form of one or more elongated continuums of fibrous material.

19. The barrier member described in claim 4 wherein said separation material is in the form of one or more elongated continuums of fibrous material.

20. The barrier member described in claim 5 wherein said separation material is in the form of one or more elongated continuums of fibrous material.

21. The barrier member described in claim 6 wherein said separation material is in the form of one or more elongated continuums of fibrous material.

22. The barrier member described in claim 7 wherein said separation material is in the form of one or more elongated continuums of fibrous material.

23. The barrier member described in claim 8 wherein said separation material is in the form of one or more elongated continuums of fibrous material.

24. The barrier member described in claim 9 wherein said separation material is in the form of one or more elongated continuums of fibrous material.

25. The barrier member described in claim 10 wherein said separation material is in the form of one or more elongated continuums of fibrous material.

26. The barrier member described in claim 11 wherein said separation material is in the form of one or more elongated continuums of fibrous material.

27. The barrier member described in claim 12 wherein said separation material is in the form of one or more elongated continuums of fibrous material.

28. The barrier member described in claim 13 wherein said separation material is in the form of one or more elongated continuums of fibrous material.

29. The barrier member described in claim 14 wherein said separation material is in the form of one or more elongated continuums of fibrous material.

30. The barrier member described in claim 15 wherein said separation material is in the form of one or more elongated continuums of fibrous material.

31. The barrier member described in claim 1 wherein said array and said separation material are made from material that is capable of their being autogenously bonded to each other.

32. The barrier member described in claim 2 wherein said arrays and said separation material are made from material that is capable of their being autogenously bonded to each other.

33. The barrier member described in claim 3 wherein said arrays and said separation material are made from material that is capable of their being autogenously bonded to each other.

34. A method of making a pressure differential barrier member for use in apparatus for separating selected substances from a stream of fluid moving relative thereto by which said substances are being borne, comprising the steps of forming an array of bridges in which the bridges constituting each adjacent pair of bridges are spaced apart from each other and joined to each other by an interconnection means, and wherein, with respect to said array, the orientation of said bridges is along a common axis line, each of said bridges has side edges, each of which side edges occupies a plane that is substantially parallel to said axis line, and each of said bridges spans a bridged space that is open to the flow of fluid therethrough, each of said interconnection means is continuous with the adjacent pair of bridges between which it is located, and, together with the side edges of those bridges between which it is located, bounds a space that is open to the flow of fluid therethrough, the bridges and the interconnecting means therebetween are made from material whose physical characteristics include incompressibility sufficient to maintain spaced apart from each other to a predetermined extent bodies of separation material that are positioned on both sides of each of said bridges abutting substantially entirely the side edges of said bridges, and retentively positioning separation material on both sides of each of said bridges abutting the side edges of said bridges, covering substantially entirely the access thereto under the side edges of the spanning portion of said bridge.

35. The method described in claim 34 wherein making said barrier member includes the steps of forming at least two substantially parallel such arrays of bridges and other structural elements by which said arrays are positionally fixed in spaced-apart relationship with respect to each other, said arrays and said structural elements being selected from the group which, with respect to the fluid being treated and the substances selected to be separated therefrom, consists of (1) those which do not include flow paths for the passage of said fluid, (2) those which include flow paths for the passage of said fluid and themselves are able to separate said selected substances from said fluid, and (3) those which include flow paths for the passage of said fluid and themselves are not able to separate said selected substances from said fluid, and causing said barrier member to include separation material through which will pass substantially all of the fluid which passes through the flow paths that are included in those among said arrays of bridges and said other structural elements which themselves are not able to separate said selected substances from said fluid.

36. The method described in claim 35 wherein making said barrier member includes the step of forming the access to a bridged space in at least one of said arrays via an elongated opening in said barrier member that also provides access to the bridged space in at least one other of said arrays of bridges.

37. The method described in claim 35 wherein making said barrier member includes the step of forming said arrays of bridges positionally retained in spaced-apart relationship to each other by means of structural elements of said barrier member with which they are in physical continuity as parts of a common physical entity.

38. The method described in claim 36 wherein making said barrier member includes the step of forming said arrays of bridges positionally retained in spaced-apart relationship to each other by means of structural elements of said barrier member with which they are in physical continuity as parts of a common physical entity.

39. The method described in claim 34 wherein making said barrier member includes the step of forming it in the form of a tube.

40. The method described in claim 35 wherein making said barrier member includes the step of forming it in the form of a tube.

41. The method described in claim 36 wherein making said barrier member includes the step of forming it in the form of a tube.

42. The method described in claim 37 wherein making said barrier member includes the step of forming it in the form of a tube.

43. The method described in claim 38 wherein making said barrier member includes the step of forming it in the form of a tube.

44. The method described in claim 39 wherein making said barrier member includes the step of forming said array of axially aligned bridges helically around said barrier member.

45. The method described in claim 40 wherein making said barrier member includes the step of forming at least some of said arrays of bridges helically about said barrier member.

46. The method described in claim 41 wherein making said barrier member includes the step of forming at least some of said arrays of bridges helically about said barrier member.

47. The method described in claim 42 wherein making said barrier member includes the step of forming at least some of said arrays of bridges helically about said barrier member.

48. The method described in claim 43 wherein said step of making said barrier member includes the step of forming at least some of said arrays of bridges helically about said barrier member.

49. The method described in claim 34 wherein said step of retentively positioning said separation material is carried out using separation material that is in the form of one or more elongated continuums of fibrous material.

50. The method described in claim 35 wherein said step of retentively positioning said separation material is carried out using separation material that is in the form of one or more elongated continuums of fibrous material.

51. The method described in claim 36 wherein said step of retentively positioning said separation material is carried out using separation material that is in the form of one or more elongated continuums of fibrous material.

52. The method described in claim 37 wherein said step of retentively positioning said separation material is carried out using separation material that is in the form of one or more elongated continuums of fibrous material.

53. The method described in claim 38 wherein said step of retentively positioning said separation material is carried out using separation material that is in the form of one or more elongated continuums of fibrous material.

54. The method described in claim 39 wherein said step of retentively positioning said separation material is carried out using separation material that is in the form of one or more elongated continuums of fibrous material.

55. The method described in claim 40 wherein said step of retentively positioning said separation material is carried out using separation material that is in the form of one or more elongated continuums of fibrous material.

56. The method described in claim 41 wherein said step of retentively positioning said separation material is carried out using separation material that is in the form of one or more elongated continuums of fibrous material.

57. The method described in claim 42 wherein said step of retentively positioning said separation material is carried out using separation material that is in the form of one or more elongated continuums of fibrous material, 58. The method described in claim 43 wherein said step of retentively positioning said separation material is carried out using separation material that is in the form of one or more elongated continuums of fibrous material.

59. The method described in claim 44 wherein said step of retentively positioning said separation material is carried out using separation material that is in the form of one or more elongated continuums of fibrous material.

60. The method described in claim 45 wherein said step of retentively positioning said separation material is carried out using separation material that is in the form of one or more elongated continuums of fibrous material.

61. The method described in claim 46 wherein said step of retentively positioning said separation material is carried out using separation material that is in the form of one or more elongated continuums of fibrous material.

62. The method described in claim 47 wherein said step of retentively positioning said separation material is carried out using separation material that is in the form of one or more elongated continuums of fibrous material.

63. The method described in claim 48 wherein said step of retentively positioning said separation material is carried out using separation material that is in the form of one or more elongated continuums of fibrous material.

64. The method described in claim 34 wherein said array and said separation material are made from material that is capable of their being autogenously bonded to each other.

65. The barrier member described in claim 35 wherein said arrays and said separation material are made from material that is capable of their being autogenously bonded to each other.

66. The barrier member described in claim 36 wherein said arrays and said separation material are made from material that is capable of their being autogenously bonded to each other.

* * * * *